(12) United States Patent
Siegel et al.

(10) Patent No.: US 9,860,228 B2
(45) Date of Patent: *Jan. 2, 2018

(54) PRE-DELIVERY AUTHENTICATION

(71) Applicant: AT&T Intellectual Property I, L.P., Atlanta, GA (US)

(72) Inventors: Steven A. Siegel, Mendham, NJ (US); Amy Zwarico, Mountain Brook, AL (US); Larry B. Pearson, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,328

(22) Filed: Oct. 29, 2016

(65) Prior Publication Data

US 2017/0048227 A1 Feb. 16, 2017

Related U.S. Application Data

(63) Continuation of application No. 14/922,162, filed on Oct. 25, 2015, now Pat. No. 9,503,445, which is a continuation of application No. 14/066,834, filed on Oct. 30, 2013, now Pat. No. 9,203,823.

(51) Int. Cl.
*H04L 29/06* (2006.01)
(52) U.S. Cl.
CPC ............. *H04L 63/08* (2013.01); *H04L 63/12* (2013.01)

(58) Field of Classification Search
CPC ........................................................ H04L 63/08
See application file for complete search history.

(56) References Cited

U.S. PATENT DOCUMENTS

| | | | |
|---|---|---|---|
| 5,623,601 A | 4/1997 | Vu | |
| 6,829,709 B1 * | 12/2004 | Acharya | H04L 63/164 370/338 |
| 7,269,624 B1 | 9/2007 | Malik | |
| 7,437,457 B1 | 10/2008 | Eisendrath et al. | |
| 7,603,697 B1 | 10/2009 | Kupsh et al. | |
| 7,676,829 B1 | 3/2010 | Gui et al. | |
| 7,870,201 B2 | 1/2011 | Madams et al. | |
| 7,895,298 B1 * | 2/2011 | Murray | G06F 17/30017 709/219 |
| 8,090,782 B2 | 1/2012 | Fletcher | |

(Continued)

OTHER PUBLICATIONS

Hallsteinsen, et al. "Using the mobile phone as a Security token for unified authentication," IEEE Second International Conference on Systems and Networks Communications, (ICSNC 2007), 6 pages.

(Continued)

*Primary Examiner* — Shawnchoy Rahman
(74) *Attorney, Agent, or Firm* — Scott P. Zimmerman, PLLC

(57) ABSTRACT

Pre-delivery authentication may be required prior to routing and delivery of electronic content. A sender of the electronic content, for example, may require that a recipient authenticate to ensure legitimate use or identity. Should pre-delivery authentication be required, the electronic content is held at any networked device while the recipient authenticates. If the recipient correctly authenticates, then the electronic content is released for delivery.

20 Claims, 6 Drawing Sheets

(56) References Cited

U.S. PATENT DOCUMENTS

| | | |
|---|---|---|
| 8,195,819 B1 | 6/2012 | Delker et al. |
| 8,209,536 B2 | 6/2012 | Yao |
| 8,336,082 B2 | 12/2012 | Jin |
| 8,364,962 B2 | 1/2013 | Yao et al. |
| 8,447,821 B2 | 5/2013 | Gardner et al. |
| 8,830,496 B2 | 9/2014 | Itogawa et al. |
| 9,154,484 B2 * | 10/2015 | Wing .................. H04L 63/08 |
| 2002/0090089 A1 | 7/2002 | Branigan |
| 2004/0030916 A1 | 2/2004 | Karamchedu |
| 2005/0010963 A1 | 1/2005 | Zeng et al. |
| 2005/0091539 A1 | 4/2005 | Wang et al. |
| 2005/0154527 A1 * | 7/2005 | Ulrich .................. G06Q 10/08 701/517 |
| 2006/0218393 A1 | 9/2006 | Hernandez et al. |
| 2006/0230461 A1 | 10/2006 | Hauser |
| 2007/0124516 A1 | 5/2007 | Ohara et al. |
| 2007/0253602 A1 | 11/2007 | Amano |
| 2007/0286376 A1 | 12/2007 | Maximo et al. |
| 2008/0313704 A1 | 12/2008 | Sivaprasad et al. |
| 2009/0028101 A1 * | 1/2009 | Kakumaru ............. H04L 63/08 370/329 |
| 2009/0125992 A1 | 5/2009 | Larsson et al. |
| 2009/0177673 A1 | 7/2009 | Cunningham |
| 2009/0292814 A1 | 11/2009 | Ting et al. |
| 2010/0024020 A1 | 1/2010 | Baugher et al. |
| 2010/0048167 A1 | 2/2010 | Chow et al. |
| 2010/0313250 A1 | 12/2010 | Chow |
| 2011/0145273 A1 | 6/2011 | Kolathaya et al. |
| 2011/0237274 A1 | 9/2011 | Wong et al. |
| 2011/0277024 A1 | 11/2011 | Begley et al. |
| 2012/0239950 A1 | 9/2012 | Davis |
| 2013/0061289 A1 | 3/2013 | McFarland et al. |
| 2013/0194301 A1 | 8/2013 | Robbins |
| 2013/0262873 A1 | 10/2013 | Read et al. |
| 2014/0143088 A1 * | 5/2014 | Moore ............... G06Q 30/0633 705/26.8 |
| 2014/0298420 A1 | 10/2014 | Barton et al. |
| 2014/0304808 A1 | 10/2014 | Martini |
| 2015/0036928 A1 | 2/2015 | Sheth |

OTHER PUBLICATIONS

Thanh, Do Van, et al., "Simple Strong Authentication for Internet Applications Using Mobile Phones," IEEE Globecom 2008 Proceedings, 5 pages.

* cited by examiner

| Selective Authentication Instructions | | | |
|---|---|---|---|
| Registered Electronic Devices: | End User Authentication | Auth. Type | |
| 1. Cellular Telephone 1 ("Jack's Cellphone) Device ID: XZYF12HGB34 | No | Fingerprint Scan | |
| 2. Computer 1 ("Home Computer) Device I: HJDC46YU675) | No | N/A | |
| 3. Computer 2 (Work Computer") Device ID 12KLXS9876 | Yes | Passcode | |
| 4. Tablet Computer 1 ("Ipad") Device ID: 98734HJG23 | Yes | Passcode | |
| 5. PDA 1 ("Ipod Touch") Device ID: IJU8HGYTX | No | N/A | |
| Default Instructions for Electronic Devices Used Later | | | |
| [x] Automatically register new devices | | | |
| [ ] Automatically require authentication for new devices | | | |
| [x] Require authentication instructions bgefore allowing new devices to access network | | | |

FIG. 1

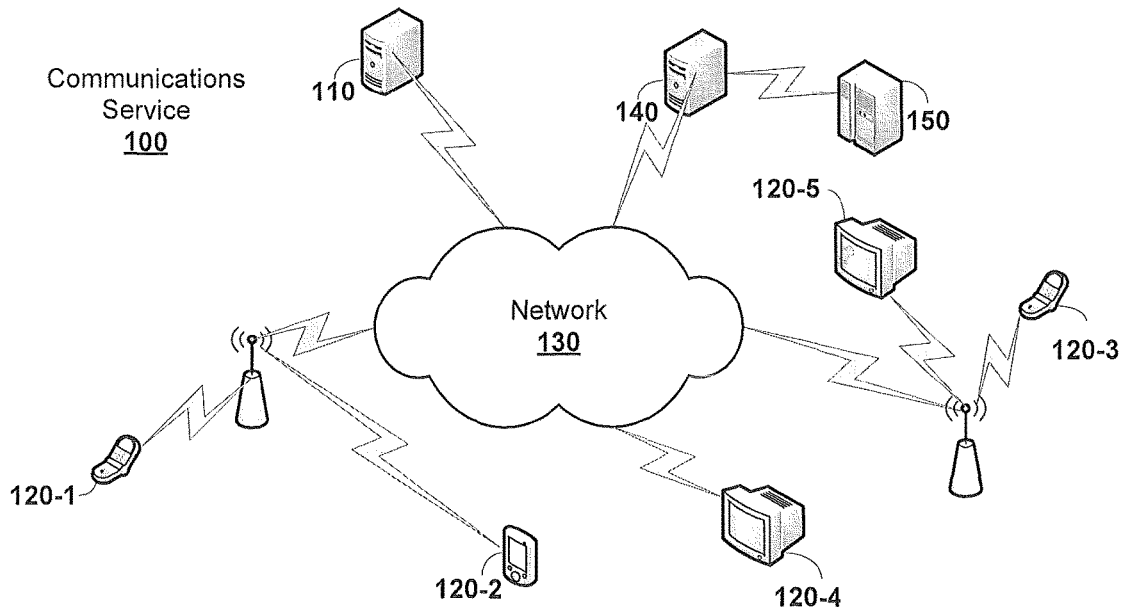

FIG. 2

| Selective Authenticaiton Use Cases | | |
|---|---|---|
| Service Type: | Service Attributes: | Options: |
| 1. Terminating Service | Recipient specifies in advance that messages may only be delivered to selected devices after recipient provides authentication. | May only apply for specific callers. |
| 2. Originating Service | Message originator (caller) specifies that message only delivered if recipient provides authentication. | May only apply for certain users or types of devices. |
| 3. Combined Service | Message originator (caller) designates communication as being private. Terminating service rules only apply for communications having the private designation. | |
| 4. Pre-Screening Terminating Service | Recipient does not want to be alerted (i.e., phone rings, message indicator appears, etc.) unless the communications service has authenticated the originator. | May only apply for certain callers or to certain types of calls. |
| 5. Pre-Verified Originating Service | Originator requests that the communications service notify the recipient that the originator has been authenticated. | May only apply for certain recipients. |
| 6. Mid-Communication Authentication | End-user authentication performed during the middle of a session. | |

*FIG. 4*

PRE-DELIVERY AUTHENTICATION

CROSS-REFERENCE TO RELATED APPLICATIONS

This application is a continuation of U.S. application Ser. No. 14/922,162 filed Oct. 25, 2015 and since issued as U.S. Pat. No. 9,503,445, which is a continuation of U.S. application Ser. No. 14/066,834 filed Oct. 30, 2013 and since issued as U.S. Pat. No. 9,203,823, with both applications incorporated herein by reference in their entireties.

FIELD OF THE INVENTION

The present invention relates to electronic communications and, more particularly, to authentication techniques for electronic communications.

BACKGROUND

Electronic communications are now ubiquitous, with individuals communicating electronically on a daily basis with other individuals and with remote servers via telephone, e-mail, text messaging, the Internet and the like. Many if not most individuals now use multiple electronic devices to engage in these electronic communications. For example, an individual might routinely access a specific e-mail account from a work computer, a home computer, a cellular telephone and a tablet computer, and might also occasionally access this e-mail account from other electronic devices such as hotel computers. As another example, individuals may have incoming telephone calls sequentially routed to multiple different telephones such as a home telephone, a cellular telephone, a work telephone, etc. until the call is answered.

It may be important to ensure that electronic communications are only received by the intended recipient of the communication. Accordingly, users are routinely required to provide usernames, passwords and/or other authentication information when logging into communications services, websites and the like so that the service or system can confirm that communications are sent to the intended recipients. In some cases, the authentication information is stored in the electronic devices and automatically supplied to the communications service, website, network or the like so that the authentication step is transparent to the user. For example, cellular telephones and other electronic devices (e.g., tablet computers and certain other handheld devices) perform authentication automatically when the telephone/device establishes connectivity with the communications service (e.g., the cellular telephone network of the communications service provider) at power-on or when the device enters a covered area from a "no-service" area. In other instances, user's are required to manually provide authentication information when logging into a communications service such as, for example, Skype or Facebook (e.g., by typing in a password).

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments provide methods of operating a communications service in which a communication is received that is addressed to a user of a communication service. A determination is made that end user authentication is required before the communication may be delivered to a first electronic device that is associated with the user. A request for end user authentication is forwarded to the first electronic device in response to determining that end user authentication is required. End user authentication information is received via the first electronic device. The received end user authentication information is compared to stored end user authentication information for the user that is stored in a data storage device. The communication is forwarded over a network to the first electronic device in response to determining that the received end user authentication information matches the stored end user authentication information for the user.

In some embodiments, prior to receiving the communication, an instruction is received from the user that end user authentication applies with respect to at least some communications that are to be received at the first electronic device. Instructions may also be received from the user that end user authentication does not apply with respect to communications that are to be received at a second electronic device that is associated with the user.

In other embodiments, prior to receiving the communication, an instruction may be received from the user that end user authentication applies with respect to at least some communications that are sent to the user from an originator of the communication. In still other embodiments, an instruction may be received from an originator of the communication that end user authentication applies with respect to the communication.

In some embodiments, the communication may be forwarded to a second electronic device associated with the user without forwarding a request for end user authentication to the second electronic device. In some embodiments, the communication may be forwarded to the second electronic device prior to receiving the end user authentication information.

In some embodiments, authentication progress information may be forwarded to an electronic device at which the communication originated. Moreover, an authentication capability of the first electronic device may be determined prior to forwarding the request for end user authentication to the first electronic device, and the type of end user authentication information requested may be based on the determined authentication capability of the first electronic device.

In some embodiments, the first electronic device may be a shared electronic device. The communication may comprise, for example, a session request such as a request to establish a telephone call. End user authentication requirements for the first electronic device and for a second electronic device associated with the user may be received, where the authentication requirement for the first electronic device is different than the authentication requirement for the second electronic device.

Pursuant to further embodiments, methods of forwarding a communication over a communications network are provided in which the communication is received over the communications network that is addressed to a user of a communications service. An instruction to obtain end user authentication information prior to delivering the communication to the user is received from an originator of the communication. A request for end user authentication information is forwarded to an electronic device that is associated with the user. End user authentication information is received via the electronic device. The communication is forwarded to the electronic device in response to verifying that the received end user authentication information matches end user authentication information for the user that is stored in a data store.

In some embodiments, the instruction and the communication are received together. In some embodiments, a capability of the electronic device is determined prior to forwarding the request for end user authentication information to the electronic device.

In some embodiments, the communication and the instruction may be received at an applications server that is interposed onto a communications path between an electronic device which transmitted the communication and the electronic device that is associated with the user, and the applications server may cause the request for authentication information to be forwarded to the electronic device associated with the user and may receive the authentication information from the electronic device associated with the user.

Pursuant to still further embodiments, methods of selectively authenticating users before delivering communications are provided in which a communication is received that is addressed to a user of a communications service. It may be determined that the user has a first electronic device and a second electronic device registered with the communications service. The communication is forwarded to the first electronic device without requesting end user authentication. A request for end user authentication is forwarded to the second electronic device in response to determining that end user authentication is required before the communication may be delivered to the second electronic device.

In some embodiments, the first electronic device may be registered with the communications service as not requiring end user authentication and the second electronic device may be registered with the communications service as requiring end user authentication in at least some instances. The communication may be forwarded to the first electronic device prior to receiving the end user authentication information from the second electronic device.

Other methods, systems, articles of manufacture, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which:

FIG. 1 is a schematic diagram of an example menu that may be used to allow a user to specify the type of authentication that will be required for each electronic device registered with a communication service.

FIG. 2 is a schematic network diagram that illustrates various electronic devices that may be involved in the transmission and delivery of a communication from a first user to a second user via a communication service according to some embodiments.

FIG. 4 is a table that illustrates several different use cases in which per-communication authentication may be employed.

DETAILED DESCRIPTION

Figure 3:
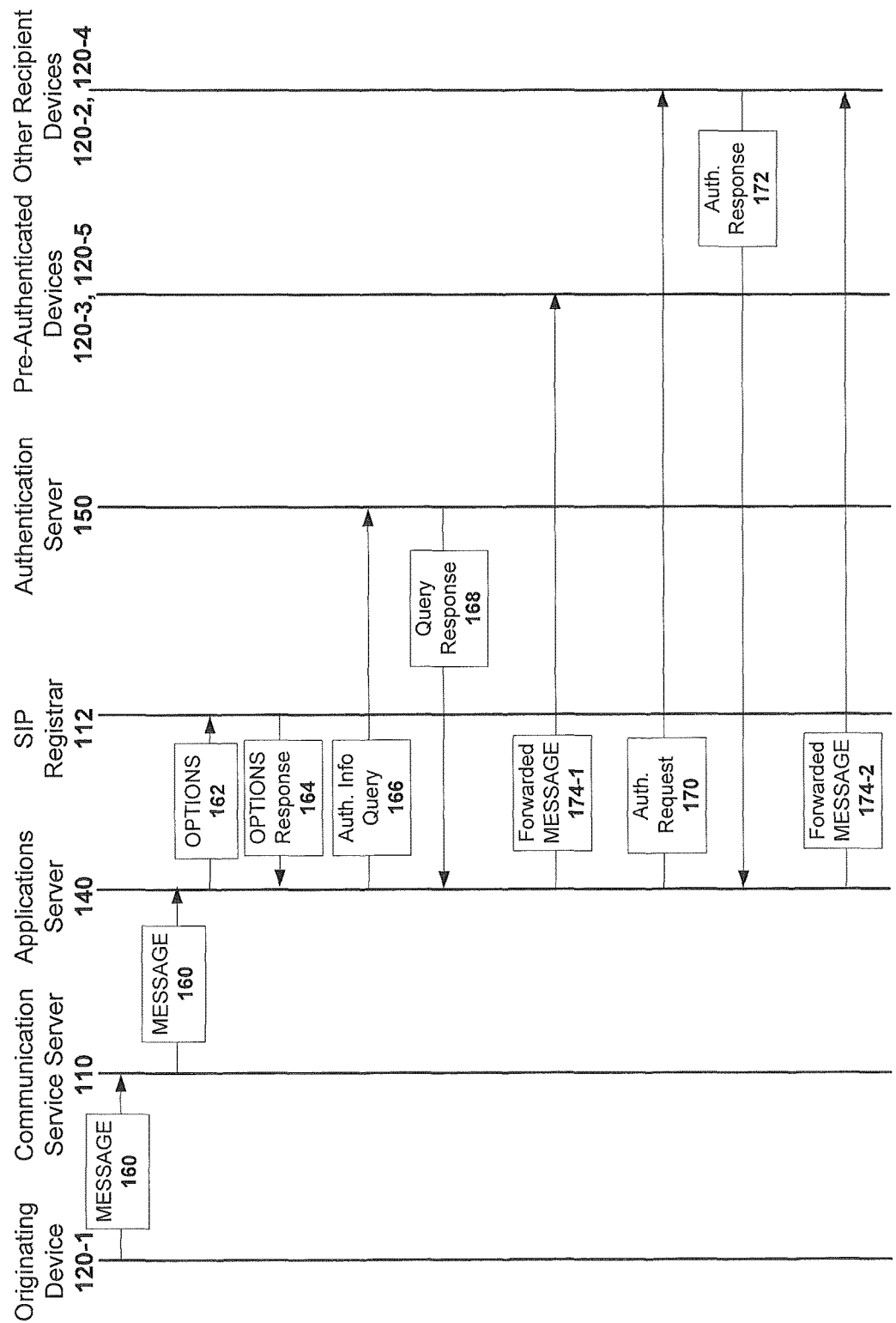
FIG. 3 is a message flow diagram that illustrates communications that may be sent to deliver a communication using the selective authentication techniques according to some embodiments.

While the invention is susceptible to various modifications and alternative forms, specific embodiments thereof are shown by way of example in the drawings and are described in detail herein. It should be understood, however, that there is no intent to limit the invention to the particular forms disclosed, but on the contrary, the invention is to cover all modifications, equivalents, and alternatives falling within the spirit and scope of the invention as defined by the claims.

Methods and systems are provided that allow a user of a communications service to selectively specify whether or not "end user authentication" is required with respect to communications that are sent to the user and/or with respect to communications that are sent by the user. As used herein, the term "end user authentication" refers to a requirement that an intended recipient of a communication provide "end user authentication information" on at least a "per communication" basis (i.e., with respect to each message or session, or even multiple times during a session). "End user authentication information" refers to authentication information that is specified by, or personal to, a particular user such as, for example, passcodes, pass words, fingerprint patterns, iris patterns, voice prints, etc. Thus, when end user authentication is required, an electronic device associated with an intended recipient of a communication will be prompted to provide end user authentication information, and the communication will only be delivered to the electronic device at issue if the correct end user authentication information is received in response to this request. Herein a "user" refers to an individual (or group of individuals) that have subscribed to the communications service and/or that may receive communications from the communication service.

In some embodiments, a user may selectively specify that end user authentication applies with respect to the different electronic devices at which the user may transmit and receive communications via a communications service. Thus, for example, the user may specify that end user authentication applies with respect to a first electronic device that the user has registered with the communications service (e.g., a work telephone, a shared home computer, or another electronic device that is shared and/or accessible to others), but that end user authentication will not apply with respect to second and third electronic devices that the user has registered with the communications service (e.g., a cellular telephone, a password protected work computer and/or other electronic devices that are personal to the user and cannot be accessed by others). In this case, the communications service may deliver incoming communications (i.e., messages or session requests sent by others to the user) to the second and third automatically without requiring end user authentication, but will not deliver incoming communications to the first electronic device unless the correct end user authentication information is received from the first electronic device (in response to a request therefore) for each incoming communication. In this fashion, a user may ensure that their personal/private communications are not accessible to others on shared electronic devices that are utilized by the user, while avoiding the need to engage in authentication measures before receiving incoming communications on electronic devices that are personal to the user.

While end user authentication may be selectively applied on a "per-device" basis as discussed in the example above, it will be appreciated that any appropriate criteria may be established that specifies when end user authentication will apply. For example, in other embodiments, a user may specify that end user authentication selectively applies based on the identity of the originator (sender) of an incoming communication. In still other embodiments, a user may also, or alternatively, specify that outgoing communications (i.e., messages or session requests that the user sends to others via the communications service) not be delivered to electronic devices of the intended recipient (or to selected electronic devices or classes of electronic devices of the intended recipient) until after authentication has been obtained from the intended recipient. Such functionality may be important for users that routinely send communications containing private information (e.g., communications containing medical test results). Selective authentication may also be specified based on any other desired criteria (e.g., time of day that a communication is received, country of origin, etc.).

Additionally, end user authentication may, in some embodiments, be more than a binary decision, and the level of assurance that is required before a communication is delivered may vary based on different criteria, which criteria may be selected, for example, by sender or receiver of a communication. For example, governments or businesses may require more onerous authentication requirements including, for example, multiple types of end user authentication (e.g., a password and a fingerprint scan). The communications service may be set up so that a communication will not be delivered to the intended recipient unless the recipient electronic device returns the correct end user authentication information for each requested type of end user authentication. In contrast, personal and/or consumer communications may require less onerous end user authentication such as simple passcode. Moreover, the type and/or amount of end user authentication that is required may differ based on any of a number of different parameters including, for example, the electronic device that is to receive the communication, the sender of the communication, a privacy level associated with the communication, etc.

There are many communications services that a user may join. Examples include electronic alerts (e.g., weather alerts, traffic alerts, security alerts, etc.), messaging services (e.g., chat services, text messaging, Facebook, Twitter, SnapChat, Instagram), voice/video communication services (e.g., cellular telephone, public service telephone network telephone service, cellular telephone data service, voicemail, Skype), etc. These communications services may provide their own communications network (e.g., a cellular telephone network) or may transmit communications over networks maintained by others (e.g., the Internet). The communications services may operate under a variety of different communications protocols and architectures (e.g., IMS, SIP, SMPP, MM7, WebRTC, etc.). Users may join some of these communications services for free (e.g., Skype), while others (e.g., cellular telephone service, landline telephone service, etc.) may have subscription fees, per-use fees or other associated charges.

Users of the above-described communications services may receive communications from, for example, other users of the service (e.g., Facebook, Skype), from the service itself (e.g., weather alerts), or from users of another communications service (e.g., users of a different cellular service provider). The communications service must know where to deliver these communications so that they will be received by the user. Accordingly, when a user registers with a communications service, the user may, at that time, identify the electronic devices that are associated with the user (e.g., a cellular telephone, a home computer, etc.) that are to receive incoming communications and that may transmit outgoing communications via the communications service. A user may also, or alternatively, identify at a later time additional (or alternate) electronic devices that are to receive communications forwarded by the communication service.

With many communications services, once a user registers a particular electronic device with the communications service, incoming communications may then be forwarded to that electronic device automatically so long as the electronic device is powered on and has connectivity to the communications service (e.g., a user may automatically receive weather alerts from a weather alert service on their cellular telephone, on their work computer and on a tablet computer at home, without any action required by the user). Other communications services may require authentication in the form of, for example, a password or passcode, before delivering a communication to each electronic device that is registered with the communications service (e.g., in order to receive messages via Facebook a user must log into Facebook by supplying a user name and password before the messages will be delivered to the user on that electronic device). This authentication is typically provided at the time that the user logs onto the communications service from a particular electronic device, and once logged on the communications service will deliver communications to the user at that electronic device until the user logs off or disconnects from the communications service.

Often, a user of a communications service may request that incoming communications be sent to multiple electronic devices. For example, a user may want to be able to receive e-mails and/or text messages on a personal cellular telephone, on a personal computer, on a work telephone, on a shared house telephone, on a tablet computer, etc. Some of these electronic devices may be password protected or have other forms of security or authentication (fingerprint scans, iris scans, etc.), while others may not. Also, some of these electronic devices may be solely under the control of the user (e.g., a cellular telephone), while other devices may be shared at all times (e.g., a home telephone may be shared by multiple people living in an apartment), and while still other devices may be generally dedicated to the user, but may occasionally be used or monitored by others (e.g., a work telephone may be dedicated to the user, but a secretary may answer calls when the user is out of the office). The fact that multiple users may register identities on, or have access to, the same electronic device may cause difficulties as incoming communications may generally be offered to such a shared electronic device without consideration as to which user may presently have access to the electronic device.

Personal and/or private information may routinely be exchanged via the above-referenced communications services. Accordingly, it may be problematic if incoming messages that contain such personal/private information are delivered to shared (or generally accessible) electronic devices where the incoming messages may be received or accessed by individuals other than the user. For example, each incoming text message may be prominently displayed on the home screen of a computer (e.g., a tablet computer) as the message is received at the computer. The text message may thus be viewed by anyone who can see the computer screen, which will often include individuals other than the intended recipient of the text message. Text messages often contain private information (e.g., medical information, confidential business information, private personal information, etc.) and a sender may assume, wrongly in many instances, that the text message will only be viewed by the intended recipient. Thus, there may be a clear danger that personal and/or private information may be made accessible to individuals other than an intended recipient of a communication, even though the communication is only received at electronic devices associated with the user that are registered with the communications service. Additionally, even when a communication does not contain private or otherwise particularly sensitive information, if the communication is delivered to someone other than the intended recipient the sender may believe that the incoming message has been received by the intended recipient when it in fact has not been. This may result in misunderstandings or more serious problems.

Various authentication techniques are known in the art and are routinely used in attempts to ensure that only intended recipients of a communication such as a message or a session request actually receive the communication. By way of example, most telephone voicemail systems will require that a user enter a password before voicemail messages are played back to the user. This authentication step in the form of a user-supplied password may help ensure that only the intended recipient of the voicemail message in fact receives the voicemail message. If passwords were not required, anyone having access to the telephone would be able to listen to voice mail messages, which would raise a variety of privacy issues and concerns regarding whether or not the intended recipient was actually receiving the messages (since persons other than the user could delete the voicemail messages). The usefulness of voicemail messages may be greatly reduced if individuals leaving the messages do not have a high degree of confidence that the messages will (1) actually be received by the intended recipient and (2) will only be received by the intended recipient and persons the intended recipient decides to share the message with. Typically, however, if authentication is required, the same authentication process is performed for every electronic device that is used to access the voicemail system, and authentication is not required on a per communication basis (e.g., once I enter my voicemail password, I can listen to all of the voice mail messages). As discussed herein, methods and systems are disclosed herein in which end user authentication may be applied on a "per communication" basis (i.e., with respect to each received message or session request), and may be selectively applied on a "per-device" basis, a "per-caller" basis, a "per-recipient" basis, a time of day basis or any other appropriate criteria.

Various embodiments will now be described with reference to the figures.

As noted above, pursuant to some embodiments, users of a communication service may specify whether or not end user authentication will be required (i.e., end user authentication information is requested and received on a "per-communication" basis before each message or session request is delivered to an electronic device associated with the intended recipient and/or end user authentication information is requested and received one or more times during a session). Moreover, the specification that end user authentication is required may be selective in that the user may specify that end user authentication will only apply for some electronic devices, some communication originators, some communication recipients, etc.

By way of example, in some embodiments, a user may selectively specify that end user authentication will apply for certain of the electronic devices (or classes of electronic devices) that the user uses to send and receive messages via the communications service. For electronic devices for which end user authentication is required, the user may also specify the type of end user authentication procedure that will be used. When the user first signs up for or "subscribes" to a cellular telephone service, they may notify the communications service provider as to the electronic devices with which they will be accessing the network. These electronic devices are then "registered" with the communications service. The user may also, at that time, specify whether or not end user authentication will be required for each registered electronic device. In other cases, the communications service will automatically register each electronic device that a particular user uses to access the communications service at the time such access first occurs. In these embodiments, the communications service can, for example, query the user each time they access the communications service from a new (i.e., different) electronic device as to whether or not that electronic device will be subject to end user authentication. Alternatively, the communications service may simply require end user authentication for each electronic device that a user uses to access the communications service until such time that the user modifies an electronic device profile that is maintained by the communications service to indicate that end user authentication is no longer required for a particular registered electronic device.

In an example embodiment, a user may, for example, specify that end user authentication will not be necessary with respect to registered electronic devices which generally are not available for use by others, such as a cellular telephone or a password protected home computer, while the user may specify that end user authentication will be required for other registered electronic devices such as work computers, work telephones or shared home computers. Moreover, the user may specify different types of end user authentication for different electronic devices so that the user may make tradeoffs between simple end user authentication procedures (e.g., a two character passcode) for devices that are less accessible to others and more complex (and more secure) end user authentication procedures for other electronic devices that are often outside the user's control. This also allows the user to take advantage of more secure and/or easier to use end user authentication procedures such as fingerprint scans; voice recognition software, etc. that may be available on some, but not all, of the electronic devices that the user utilizes to access the communications service.

A user may notify the communications service regarding the criteria that are used to determine whether or not end user authentication will be required with respect to any given communication that is originated by, or addressed to, the user. In some embodiments, this may be done as part of the subscription process. For example, as noted above, in some cases a user may selectively require end user authentication on a "per-device" basis, meaning that end user authentication will be required with respect to communications received at some, but not all, of the electronic devices at which the user may receive incoming communications (e.g., text messages) from a particular communications service. FIG. 1 is a schematic diagram of a menu 10 that might be used in an example embodiment for the communications service (e.g., a cellular service provider) to collect information regarding the end user authentication requirements for each registered electronic device. As shown in FIG. 1, as part of the registration process the user may be prompted to enter electronic devices into a Registered Electronic Device field 20. Alternatively, the menu 10 may be automatically populated with the electronic devices that the user utilizes to access the communications service, and the menu 10 may be displayed to the user each time the user accesses the communications service from an electronic device for the first time.

As is further shown in FIG. 1, the menu 10 further includes an End User Authentication field 30. The End User Authentication field 30 allows the user to specify whether or not the communications service should require end user authentication before delivering communications to each of the registered electronic device listed in the Registered Electronic Device field 20. Thus, End User Authentication field 30 allows for "selective" end user authentication, with the user deciding which registered electronic devices will or will not be required to provide end user authentication information before each communication is delivered thereto. An Authentication Type field 40 is also provided to allow the user to specify the type of end user authentication that will be used on each electronic device that requires authentication. For example, an iPhone® 5S has a fingerprint reader built into the home button of the device which may be a particularly convenient form of end user authentication for communications received at that particular electronic device. However, most other electronic devices do not have fingerprint scanning capabilities. Thus, as shown in FIG. 1, a wide variety of different end user authentication techniques may be specified such as passwords, fingerprint scans, challenge-passphrase and voiceprint, iris scans, etc., and the most appropriate technique may be selected by the user for each electronic device in some embodiments.

As is further shown in FIG. 1, the menu 10 may also allow the user to specify what the communications service should do if the user accesses the communications service in the future from electronic devices that were not already registered with the communications service. As an example, field 50 in menu 10 allows the user to select between several options including (1) automatically registering an electronic device the first time the user accesses the communications service from that device, (2) automatically requiring authentication for all new devices (until such time that the user modifies their profile with the communications service to specify a different type of authentication), and (3) requiring the user to edit their profile before using the communications service from the new device (e.g., by displaying menu 10 to the user and requiring that the user make authentication selections for the newly registered electronic device).

While FIG. 1 illustrates one example of a user input mechanism that may be used by a user to specify on a per electronic device basis whether or not end user authentication will be required before the communications service will deliver messages to the registered electronic devices associated with the user and the type of end user authentication employed, it will be appreciated that a wide variety of input mechanisms may be used and that this information may be collected by the communications service at any appropriate time.

By way of example, in some embodiments, a user may alternatively or additionally specify that end user authentication will be required with respect to communications sent by certain individuals, organizations, IP domains, etc. A menu similar to the menu in FIG. 1 could be used, for example, to allow a user to make these specifications. A wide variety of other criteria may also be used, and appropriate menus or input mechanism may be provided that allow a user to specify the conditions under which end user authentication may be required.

Additionally, as noted above, the type and/or amount of end user authentication information that is required before a communication is delivered may vary based on any appropriate criteria. The sender or receiver of the communication may, for example, select the criteria used, either categorically or with specific criteria assigned to specific communications. Appropriate menus or other mechanisms may be provided that allow the sender and/or receiver to specify the type and/or amount of end user authentication that is required.

FIG. 2 is a schematic network diagram that illustrates various electronic devices that may be involved in the transmission and delivery of a communication from a first user to a second user via a communication service according to some embodiments.

As shown in FIG. 2, a communications service 100 may deliver communications to a plurality of users who subscribe to and/or use the communications service. Each user who is subscribed to the communications service 100 may have one or more electronic devices that are registered to receive incoming communications from the communications service 100. These communications may comprise, for example, communications that are originated by the communications service 100 (e.g., alerts), communications that are sent by other users of the communications service 100 (e.g., text messages, telephone calls or e-mails) or communications that are sent by users of other communications services (e.g., calls received by a subscriber to a first cellular telephone service that originate with a user of another cellular telephone service). The communications service 100 may be configured to forward these communications to one or more electronic devices 120 that the user has registered with the communications service 100 (the electronic devices 120 are labeled 120-1, 120-2, etc. in FIG. 2 to distinguish between different electronic devices).

Still referring to FIG. 2, the communications service 100 may have one or more servers 110 that control and implement the communication service. While a single server 110 is illustrated in the greatly simplified example of FIG. 2, it will be appreciated that the communications service 100 may employ a vast array of servers and other equipment that implement and control operations of the communications service 100. Communications may be delivered from the servers 110 of communications service 100 to the electronic devices 120 associated with users of the communications service 100 over one or more communications networks 130. In some instances, the communications may be generated by the servers 110 or other components of the communication service 100 (e.g., the servers 110 may generate alerts), while in other cases the servers 110 may receive communications from a first electronic device 120 (e.g., device 120-1) that is associated with a first user for delivery to one or more electronic devices (e.g., electronic devices 120-2, 120-3, 120-4, 120-5) that are associated with a second user of the communication service 100.

As is further shown in FIG. 2, an applications server 140 may be included in a communications path between a sending device (e.g., server 110 or electronic device 120-1) and one or more receiving electronic device(s) (e.g., electronic devices 120-2, 120-3, 120-4, 120-5). When an incoming communication is generated or received by the server 110 of the communications service 100, it may be forwarded to the applications server 140. The applications server 140 may hold the communication, if necessary, so that the communication is only delivered to the electronic devices 120 associated with the intended recipient that have provided any necessary end user authentication. In some embodiments, the end user authentication requirements and the end user authentication information for each user of the communications service may be stored in an authentication server 150, and the applications server 140 may communicate with the authentication server 150 as necessary to ensure that proper end user authentication has been obtained before the communication is delivered to specific electronic devices 120.

For example, an electronic device 120-1 that is associated with a first user of the communications service 100 may transmit a communication to the server 110 associated with the communications service 100. The communication may be addressed to a second user of the communications service 100. The second user may have a plurality of electronic devices 120-2, 120-3, 120-4, 120-5 that are registered to receive communications from the communications service 100. The applications server 140 may determine the registered electronic devices 120 that are to receive the communication, as well as the end user authentication requirements for those electronic devices 120. If some of the electronic devices 120-2, 120-3, 120-4, 120-5 are "pre-authenticated" (i.e., they have no end user authentication requirement or, equivalently, have an end user authentication requirement that is a null set), then the application server 140 may (optionally) immediately send the communication to these electronic devices (which are electronic devices 120-3 and 120-5 in the example of FIG. 2). The application server 140 will not forward the communication to the remaining electronic devices 120-2 and 120-4 until the application server 140 is notified that end user authentication information was received from those electronic devices 120-2, 120-4 that matches the end user authentication information that has been pre-stored for those electronic devices 120-2, 120-4 in, for example, the authentication server 150 or other data store.

It will be appreciated that the selective end user authentication techniques according to some embodiments may be applied to both individual communications (messages) and/or to communications sessions. For individual communications such as, for example, e-mails, text messages, alerts, etc., the application server 140 will require that any electronic device 120 that is registered to receive communications intended for a particular user must provide the specified end user authentication information (if any is required) before each incoming communication will be delivered to the electronic device 120 at issue. In contrast, with regard to communications sessions such as telephone calls, chat sessions and the like, the application server 140 will determine if the electronic device that the session is to be set up with requires end user authentication. If so, the application server 140 will not allow the session to be established until the correct end user authentication information has been received from the electronic device 120. However, once such end user authentication information has been received and the session is established, no further end user authentication may be required during the session. Once the session is concluded, end user authentication will once again be required before a new session may be established.

FIG. 3 is a message flow diagram that illustrates messages that may be sent to deliver a communication using the selective end user authentication techniques according to some embodiments. The message flow diagram of FIG. 3 is based on the communications service 100 that is described above with respect to FIG. 2. It is assumed in this example that the communications service 100 of FIG. 2 operates under the IMS architecture. In this particular example, the message flows are described with respect to a communication 160 that is sent from a first user of the communications service 100 to a second user of the communications service 100. In the initial description that follows, it is assumed that the communication 160 is a stand-alone message (e.g., an alert, a text message, etc.) as opposed to a request to initiate a communications session. It will be appreciated, however, that the end user authentication techniques disclosed herein may also be used with respect to requests to initiate a communications session and may further be used during communications sessions, as will be described in more detail below. In the example of FIG. 3, the communication 160 may have originated at a user or device of the communications service 100 or instead may have been forwarded to the communications server 100 from a different network. However, for simplicity below it is assumed that the communication 160 was sent from a first user of the communications service 100 via a first electronic device 120-1.

As shown in FIG. 3, operations may begin when the first user uses electronic device 120-1 to forward the communication 160 to a server 110 of communications service 100 over the network 130. The communication 160 may be embedded in a MESSAGE message that is forwarded by the electronic device 120-1. The communication 160 may be any electronic communication such as, for example, a text message, an alert, an e-mail, a request to set up a telephone call, etc. The communication 160 is addressed to a second user of the communications service 100. The communication 160 includes header or other control information that indicates an intended recipient for the communication. This control information may be, for example, an IMS Public User Identity, a Universal Resource Identifier or URI, etc.

As noted above, the application server 140 is inserted into the communications path between the electronic device 120-1 at which the communication originated and the electronic devices 120-2, 120-3, 120-4 associated with the second user that is the intended recipient of the communication 160. For purposes of this example, it is assumed that the second user has specified that electronic device 120-2 requires end user authentication using a passcode, that electronic device 120-3 does not require end user authentication, that electronic device 120-4 requires end user authentication using a fingerprint scanner, and that electronic device 120-5 does not require end user authentication. Upon receiving the communication 160, the application server 140 may hold it while a determination is made as to where the communication 160 should be delivered to each of the electronic devices 120-2 through 120-5 associated with the second user.

The application server 140 may accomplish this, for example, using an OPTION message in IMS. In particular, upon receiving the communication 160, the application server 140 may forward an OPTIONS message 162 to, for example, the IMS SIP Registrar 112. The SIP Registrar 112 may track for a particular user of the communications service 100 the electronic device(s) 120 with which the user is accessing the communications service 100 and the locations (e.g., IP addresses) of those devices 120. One of the electronic device characteristics that may be stored in the SIP Registrar 112 is that end user authentication has been specified for the electronic device 120. In response to the OPTIONS message 162, the SIP Registrar 112 may return to the applications server 140 a message 164 listing the electronic device(s) 120 registered to the second user to which the communication should be delivered and information regarding the capabilities of those electronic devices 120. The application server 140 may also send a query 166 to the authentication server 150 to determine which of the electronic devices 120-2, 120-3, 120-4, 120-5 require end user authentication be performed prior to delivery of communications, and the type of end user authentication that is to be performed on each such electronic device 120. The authentication server 150 may return the requested information to the applications server 140 in a query response 168.

Next, the applications server 140 may forward a request 170 to each electronic device 120-2, 120-4 for which end user authentication is required. The second user may provide the requested end user authentication information from, for example, electronic device 120-2 (which may be the electronic device that the second user is currently using to access the communications service 100), and a message 172 containing the requested end user authentication information is then transmitted from the electronic device 120-2 back to the applications server 140.

In some embodiments, the applications server 140 may instruct the communications server 110 to forward the communication 160 to the electronic devices 120 associated with the second user that do not require end user authentication (i.e., to electronic devices 120-3, 120-5 in this example) prior to receiving the message 172 containing the requested end user authentication information from electronic device 120-2. This forwarded communication 160 is labeled "Forwarded MESSAGE" 174-1 in FIG. 3. The communication 160 may be forwarded to electronic devices 120-3, 120-5 either before, at the same time as, or after the request for end user authentication 170 is sent to the remaining registered electronic devices 120-2 and 120-4. In other embodiments, the applications server 140 may request end user authentication information from electronic devices 120-2 and 120-4 via end user authentication requests 170 prior to instructing the communications server 110 to forward the communication 160 to any other end point destination. The applications server 140 ultimately instructs the communication server 110 to forward the communication 160 to the electronic devices 120 associated with the second user for which the applications server 140 receives the correct end user authentication information in response to the request 170 (these communications are labeled "Forwarded MESSAGE 174-2" in FIG. 3).

The process described above with respect to FIG. 3 may operate somewhat differently if the communication 160 is a session initiation request (e.g., a chat session, a telephone call) as opposed to a stand-alone communication (e.g., a text message or an e-mail). With messages (separate datagrams), the selective end user authentication techniques according to some embodiments may require authentication on a per-message basis. In contrast, with a session such as a telephone call or a chat session, in some embodiments, the selective end user authentication techniques disclosed herein may require end user authentication only on a per-session basis, and hence once end user authentication has been established it will not be required again during the session (in other embodiments, end user authentication may alternatively or additionally be required one or more times during the session, as is discussed below with reference to FIG. 4). The discussion that follows explains how end user authentication may be implemented in IMS for a telephone call as an example session type.

Each shared electronic device of the second user (which in this example are electronic devices 120-2, 120-4) may have a distinctive alert so that the intended recipient of the session request (i.e., the second user) may respond to the request. The use of distinctive alerts may be helpful in ensuring that session requests are only answered by an intended recipient. The first user may initiate the session request by using the first electronic device 120-1 to call the second user. In response to the call, an INVITE message may be delivered to one or more of the electronic devices 120-2 through 120-5 (note that with telephone calls the electronic devices 120-2 through 120-5 of the second user typically would not all "ring" at the same time; instead, if multiple electronic devices 120 were set-up to receive the telephone call such as a work telephone and a cellular telephone, then the network would "ring" these devices sequentially until one of the devices was answered). The applications server 140 would place itself on the communications paths between electronic device 120-1 and electronic devices 120-2 through 120-5 at the time the INVITE message is originally delivered. The applications server 140 then waits for one of the electronic devices 120-2 through 120-5 of the second user to answer the call. In IMS, the answering of a call (session request) may comprise a 200 OK message that is generated by the answering electronic device. The applications server 140 receives the 200 OK message and then identifies the electronic device 120 that answered the INVITE from this message. Next, the applications server 140 may query the authentication server 150 in the manner discussed above to determine if end user authentication is required for the answering electronic device 120 and, if so, the end user authentication method and information. The applications server 140 may then send a message requesting end user authentication information from the answering electronic device 120, and may compare the end user authentication information received in response to this request to the end user authentication information provided by the authentication server 150. Once sufficient end user authentication has been established, the 200 OK message may be returned to the initiating electronic device 120-1 and the session may then be set up. Announcements or visual or audible indications of progress may be displayed to the originating user (i.e., the user who sent the session request) on the electronic device 120-1 as the end user authentication process may take longer than usual given the need to manually obtain end user authentication information from the second user as part of the session set-up process.

In some embodiments, the user of the communications service may specify the type of end user authentication that will be used for each electronic device in advance, and this information may be stored at the authentication server 150. In other embodiments, the user may only specify (and have stored) end user authentication information in advance such as passcodes, fingerprints patterns; iris patterns, etc. without specifying the type of end user authentication that will be used with each electronic device. In such embodiments, the applications server 140 may check the capabilities of the end electronic device 120 at issue (e.g., via an OPTIONS message in IMS or by checking the devices registration), and the applications server 140 may then use any available capability on the electronic device (e.g., fingerprint scanner, iris scanner, passcode, etc.) to perform the end user authentication.

It may be beneficial for the applications server 140 to be capable of determining the capabilities of the answering electronic device 120. For example, the second user may access a communications service 100 (e.g., Facebook) using an electronic device 120 that the second user has never used before to access the communications service 100 and which has not been registered with the communications service 100. This might occur, for example, when the second user accesses the communications service 100 using someone else's computer, a hotel computer or via a newly purchased electronic device. For such non-registered electronic devices, the default may be that end user authentication is required. The applications server 140 may determine the capabilities of the electronic device and then choose a suitable end user authentication method for the device. The applications server 140 may use the stored end user authentication information and the determined capabilities of the electronic device to select an appropriate end user authentication method.

While in FIG. 3 IMS is used as an example, it will be appreciated that the same functionality may be implemented for networks operating under any appropriate communications protocols and/or architectures.

As noted above, selective end user authentication may be performed based on any appropriate criteria. FIG. 4 illustrates several example use cases as to how selective end user authentication techniques may be employed. As shown in FIG. 4, in the first use case ("terminating service"), a user of a communications service may specify that incoming messages and/or session requests should not be delivered to some or all of their recipient electronic devices (i.e., the electronic devices associated with the intended recipient to which the communications service may deliver communications that are addressed to the intended recipient) unless end user authentication is obtained from the electronic devices. In some embodiments, this could apply to all communication originators, while in other embodiments the user could specify that end user authentication would only be required for a specific list of communication originators (e.g., specific health care providers). Thus, examples of "terminating service" end user authentication is end user authentication that is selectively applied on a "per-device" basis and/or on a "per-caller" basis.

As is further shown in FIG. 4, in the second use case ("originating service"), a user of the communications service may specify that outgoing messages that they are sending and/or sessions that they are setting up should not be delivered or established unless end user authentication is first established by the intended recipient of the message/session request. This will provide a level of guarantee that the communication will only be received by the intended recipient. The originator may only require that such end user authentication first be performed with respect to selected electronic devices or categories of electronic devices. In some embodiments, this could apply to all recipients, while in other embodiments the user could specify recipients for which end user authentication and/or electronic devices for which end user authentication would be required.

Still referring to FIG. 4, in yet another embodiment ("combined service"), the originator of the call may specify that the communication (e.g., message, session establishment, etc.) comprises a private communication. The termination rules applicable in the first use case would then apply to these communications, but would not be applied to other communications. Such a "combined" use case may facilitate providing enhanced security for protecting private communications while minimizing the burden on the users as end user authentication may not be required with respect to most communications (assuming that most communications will typically not be private). One or more of a wide variety of mechanisms may be provided that allow the call originator to designate the communication as being private. For example, when placing the call or sending the message, the call originator may click on a button on a screen, select an option from a menu or dialog box or the like that specifies that the particular communication at issue is a private communication. In response to this action, information may be added, for example, to the header of the message or session request that identifies the communication as comprising a private message or session request. The communications service receives this indication and then knows that the termination rules for end user authentication should be applied with respect to this communication.

Still referring to FIG. 4, it can be seen that a "pre-screening terminating service" may be provided in which a user of a communications service may request that they not be alerted regarding an incoming communication unless the communications service has authenticated the originator of the communication in advance. This service may be important, for example, in situations where the recipient of a communication cannot discern with certainty who actually sent the communication. For example, while a text message sent from a shared telephone or computer may indicate it was sent from a specific individual, the recipient ordinarily has no way of confirming that this is the case. Text messages, e-mails and the like may also be sent as pranks by a first individual who sends the communication from an electronic device associated with a second individual. Moreover, such communications that are sent by one individual posing as a different individual may be sent in more nefarious situations, such as in situations where fraudulent activities may be occurring. By requiring that the communications service obtain end user authentication before alerting the recipient of a communication (and before delivering the communication), the recipient may protect themselves against such situations.

The above-described pre-screening terminating service may be applied optionally. For example, in some embodiments, an end user can specify selected individuals in their address book for which pre-screening terminating service will apply. It could also only apply with respect to calls originating from certain sources such as domains, geographic locations, etc. Pre-screening terminating service could also be invoked on other bases such as, for example, the amount of bandwidth required for the communication or an expected cost of the communication.

As is also shown in FIG. 4, in yet further embodiments, a "pre-verified originating service" may be provided in which the originator of a communication requests that the communications service "vouch" to the recipient that the originator is who he or she purports to be. Such a service may be useful, for example, to charities or others who send communications (telephone calls, text messages, etc.) seeking donations from recipients. Given the prevalence of fraudulent communications seeking money, many individuals are highly skeptical of requests for donations as it may be difficult or impossible for the recipient of the request to verify that the request is actually being made by the purported originator of the communication. By having the communication service vouch for the originator as part of the communication delivery process the recipient may have a greater confidence that the communication is legitimate.

According to still further embodiments, authentication may be requested and received during a communication session such as a telephone call, a chat session, an online banking session, etc. Such "mid-communication authentication" may be invoked, for example, when during the course of a communication session a need arises for a higher assurance that the originator or the recipient of the communication is who they purport to be. For example, a stock broker may place a telephone call to a client. During that telephone call, the client may request that the stock broker buy or sell stocks that are part of the client's account with the stock broker. Before doing so, the stock broker may request that the communications service invoke end-user authentication so that the stock broker can confirm the identity of the end user before performing the financial transaction. Mid-communication authentication may likewise be appropriate before medical diagnoses or test results are provided to an end user.

Such mid-communication authentication may be invoked by any appropriate party including, for example, the originator of the communication, the recipient of the communication, and/or the communication service. Mid-communication authentication may be invoked at any time during a communication session, and may be invoked multiple times during a communication session. In some cases, mid-communication authentication may be invoked to require a higher level of end user authentication. For example, before a communication session is first established, either or both the originator or the recipient may be authenticated using the above-described end user authentication techniques. This authentication may be performed using a passcode or other authentication method that is more susceptible to being compromised. If during the communications session financial, medical or other transactions requiring a higher level of security need to be performed, at that point mid-communication authentication may be invoked by any appropriate party to require a more secure form of end user authentication such as a fingerprint scan or an iris scan. In other cases, mid-communication end user authentication may be performed based on the duration of a communication session, as such sessions may last for seconds, hours, or even days. For example, mid communication end user authentication may be required on a session at predetermined intervals (e.g., every 30 minutes) as a method of improving the probability that one or both end points to the communication are who they purport to be during the session.

Above, various example embodiments have been described in which end user authentication is selectively applied to selected devices of a user, to selected communication originators, to selected communications (where the originator designates that selective authentication applies), etc. However, it will be appreciated that embodiments are not limited to these examples and that, instead, selective end user authentication may be employed based on any appropriate criteria. For example, an individual who works on a tablet computer while commuting to and from work on a train may instruct the communications service to selectively employ end user authentication based on times of day when communications are received so that end user authentication will apply during the individuals' commutes to and from work. As another example, end user authentication may apply based on a priority indication that is embedded in the communication, so that end user authentication is required with respect to high priority communications. As yet additional examples, end user authentication may be required based on country of origin of the communication, based on attachments to the communication, based on combinations of various criteria, etc. Thus, it will be appreciated that the above criteria are simply examples that are provided so that this disclosure will be complete.

When a communication is received (or generated) that is addressed to a user of a communications service, the communications service may need to determine if it is authorized to forward the communication to the intended recipient. Here, end user authentication may be viewed as part of a process that is employed to determine if such authorization exists. In particular, if end user authentication applies, the communications service is not authorized to deliver the communication until end user authentication has been successfully established. Thus, the communications service may request end user authentication and then compare any end user authentication information that is received from an electronic device at issue and compare it to stored end user authentication information. If this information matches, then authorization may be implied by the match, and the communications service may forward the communication to the electronic device at issue (assuming that all other prerequisites for authorization have been met). If the received end user authentication information does not match the stored end user authentication information, then authorization is not implied, and the communication may not be delivered.

In some embodiments, more than a single service provider may be involved. For example, a first user may initiate a telephone call to a second user by dialing the telephone number of the second user. The first user may use a first telecommunications company as their service provider. The second user may use a second telecommunications company as their service provider. Here it will be assumed that the first user (the caller) has specified that end user authentication should apply for this call (or should apply if the call is received at certain electronic devices). In such a scenario, an applications server associated with the first telecommunications company may request end user authentication from the second user. Alternatively, the applications server associated with the first telecommunications company may request that the second telecommunications company request and obtain the end user authentication information and pass this end user authentication information back to the first telecommunications company for verification. Thus, it will be appreciated that the techniques according to some embodiments may be used with respect to communications that use different telecommunications companies or other types of service providers.

Various methods and systems according to some embodiments will now be discussed with reference to the flow chart diagrams of FIGS. 5-7 and the system block diagram of FIG. 8. It will be understood that various blocks of these flowcharts and/or block diagrams, and combinations thereof, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks. These computer program instructions may be stored in a tangible computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 5:
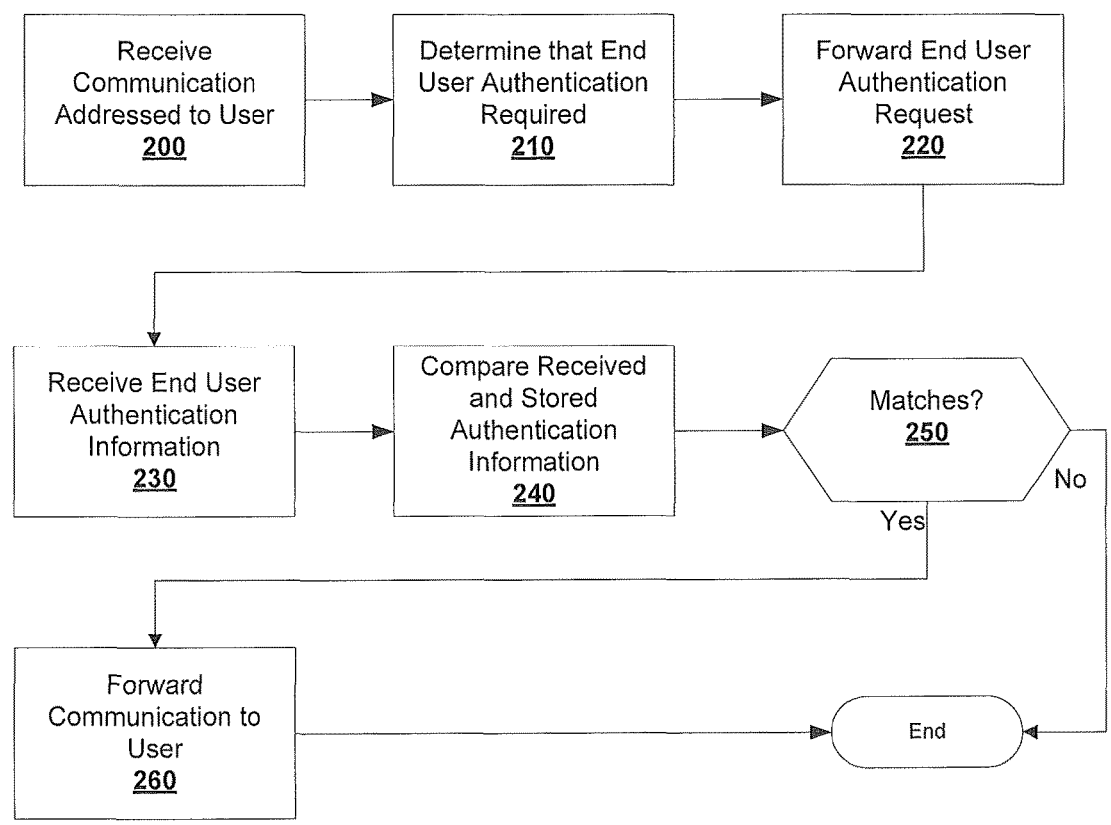
FIG. 5 is a flow chart illustrating a method of operating a communications service according to certain embodiments.

As shown in FIG. 5, pursuant to some embodiments, methods of operating a communications service are provided in which a communication is received (e.g., by a server of a communications service) that is addressed to a user of the communications service (block 200). A determination may then be made that end user authentication is required before the communication may be delivered to at least one electronic device that the user (i.e., the intended recipient of the communication) has registered with the communications service (block 210). In response to this determination, a request for end user authentication information may be forwarded to a first electronic device associated with the intended recipient for which end user authentication is required (block 220). In response to this request, end user authentication information may be received from the first electronic device (block 230). While not shown in FIG. 5, if end user authentication is not received in response to the request within a certain time frame, the request may be resent one or more times, and the process may simply end if the requested information is not received. If end user authentication information is received at block 230 from the first electronic device, it is then compared to stored end user authentication information (block 250). If the received end user authentication information matches the stored end user authentication information, then the communication is forwarded to the first electronic device (block 260). If it does not, the process may end (or, alternatively, the request for end user authentication information may be resent with an indication that the previously received end user authentication information did not match the stored end user authentication information).

Figure 6:
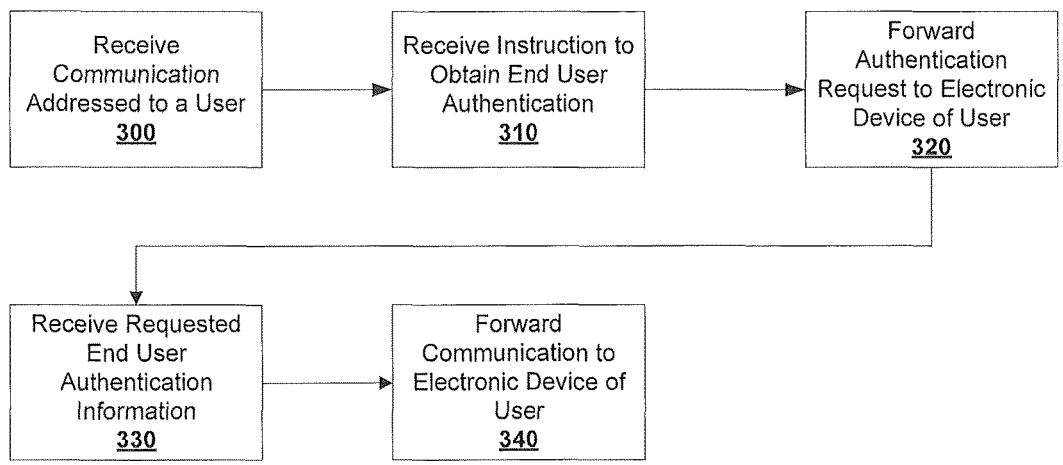
FIG. 6 is a flow chart illustrating a method of forwarding a communication over a communications network according to some embodiments.

As shown in FIG. 6, pursuant to further embodiments, methods of forwarding a communication over a communications network are provided in which a communication is received over a communications network that is addressed to a user of a communications service (block 300). In addition, a message is also received from an originator of the communication that states that end user authentication should be performed before the communication is delivered (block 310). This instruction may be embedded in the communication or delivered separately. In response to this instruction, a request for end user authentication information is sent to at least one electronic device that is associated with the user (block 320). The requested end user authentication information may thereafter be received from the electronic device (block 330). The communication may then be forwarded to the electronic device in response to verifying that the received end user authentication information matches stored end user authentication information for the user (block 340).

Figure 7:
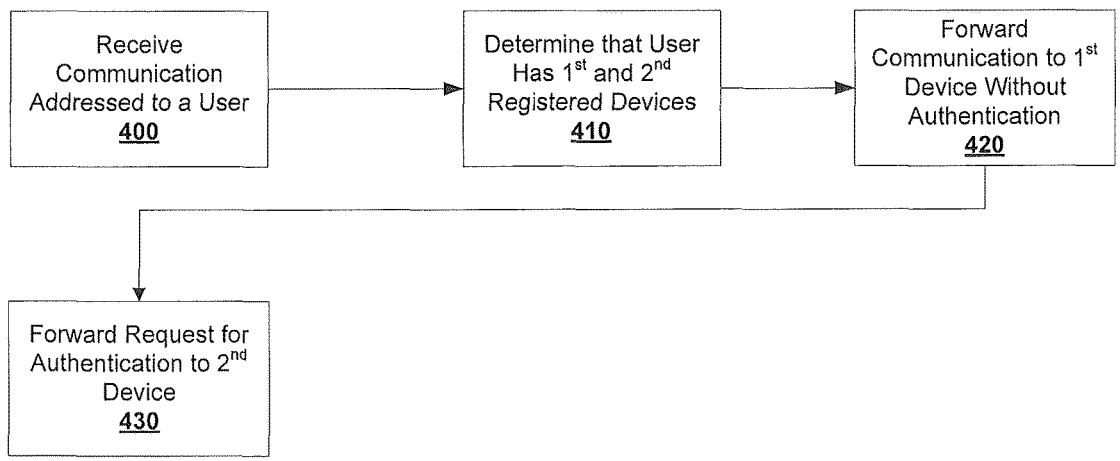
FIG. 7 is a flow chart illustrating a method of selectively authenticating electronic devices that are registered with a communications service according to some embodiments.

As shown in FIG. 7, pursuant to further embodiments, methods of selectively authenticating end users before delivering communications are provided. Pursuant to these methods, a communication may be received that is addressed to a user of the communications service (block 400). A determination may be made that the user of the communications service has at least a first electronic device and a second electronic device that are registered with the communications service that the received communication should be forwarded to (block 410). The communication may then be forwarded to the first electronic device without requesting any end user authentication information from the first electronic device (block 420). However, in lieu of immediately forwarding the communication to the second electronic device, instead a request for end user authentication information is forwarded to the second electronic device (block 430).

Figure 8:
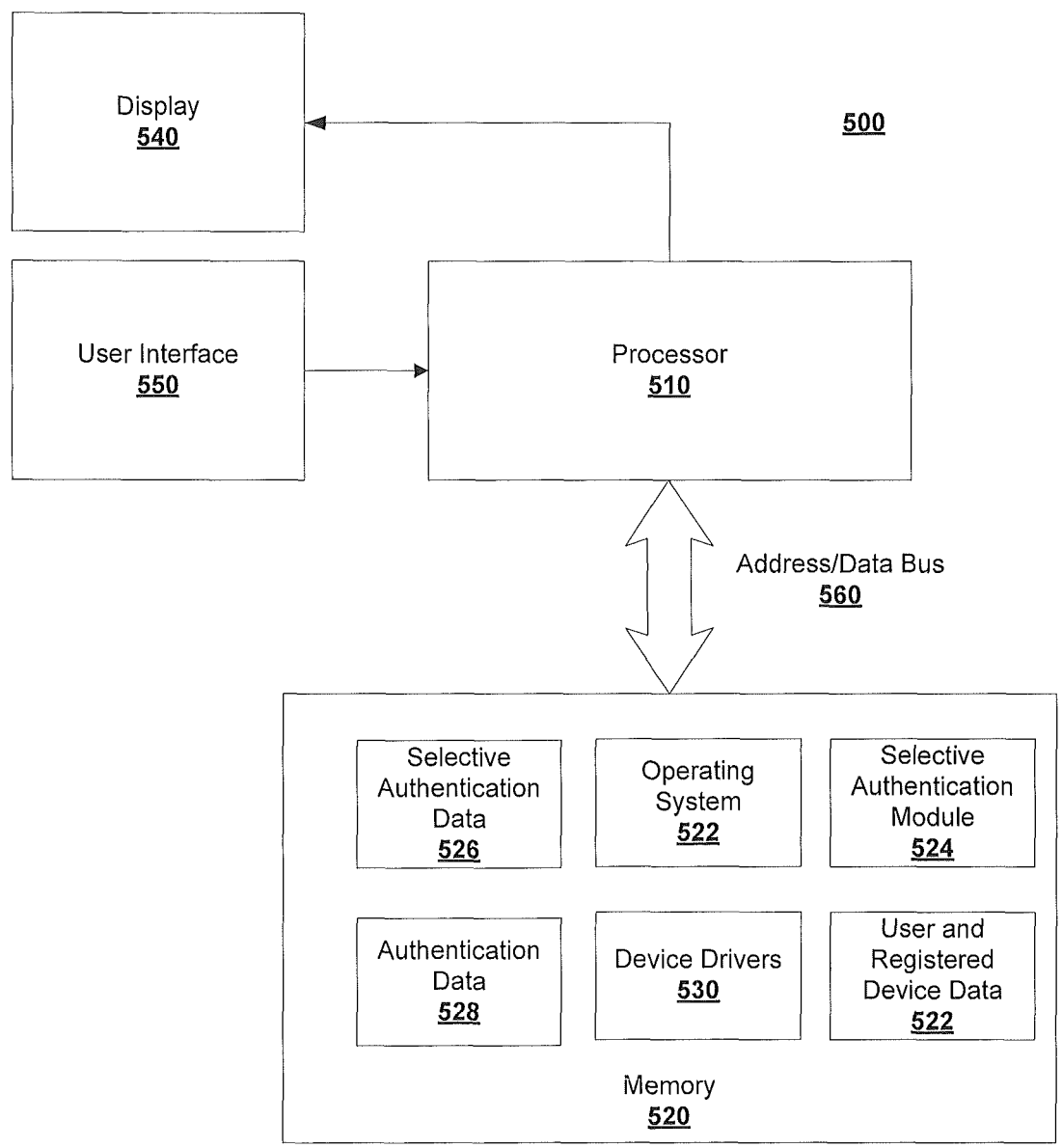
FIG. 8 is a block diagram of a selective authentication system according to some embodiments.

FIG. 8 is a block diagram illustrating a system 500 which may be used to implement selective end user authentication according to certain embodiments. The system 500 may comprise, for example, an applications server that is interposed on the communications path between a first electronic device that is forwarding a communication to a second electronic device that is registered to a user of a communications service. As shown in FIG. 8, the system 500 may include a processor 510, a memory 520, a display 540 and a user interface 550. The processor 510 may be coupled to the user interface 550 and the display 540.

The processor 510 may communicate with the memory 520 via an address/data bus 560. The processor 510 can be any appropriate processor, such as processors that are used in commercially available servers. The memory 520 is representative of the overall hierarchy of memory devices. The memory 520 can include, but is not limited to, the following types of devices: cache, ROM, PROM, EPROM, EEPROM, flash memory, SRAM, and DRAM. As shown in FIG. 8, the memory 520 may include, for example, an operating system 522 and a selective authentication module 524. The memory may also include stored data 522 regarding the electronic devices that are registered to users of the communications service. Selective end user authentication data 526 may also be stored in memory 520. The selective end user authentication data 526 may include, for example, an indication as to whether or not end user authentication is required for each registered electronic device, is required for selective incoming communications, is required for selective outgoing communications, etc. The selective end user authentication data 526 may also include an indication of a type of end user authentication to use with respect to each registered electronic device. End user authentication data 528 may also be stored in memory 520. The end user authentication data 528 may comprise, for example, passwords, fingerprint scans, iris scans, etc. Finally, the memory may also include input/output (I/O) device drivers 530. It will be appreciated that the various elements of system 500 may be located on a single device or distributed across multiple devices that may be located at different locations.

The techniques according to some embodiments may be used with both voice and text communications. Historically, end user authentication has not been required with respect to voice communications, presumably because it is assumed that the caller will recognize the voice of the person answering the call or that the call will be answered by the intended recipient. However, such assumptions are not necessarily accurate. For example, doctors or nurses who call with medical information may see the patient at issue at most a few times per year and hence may not be capable of recognizing their voice. Thus, there is a danger that they will share private patient information with a person masquerading as the intended recipient of the call. Moreover, requiring end user authentication may provide a protection to the caller (as opposed to the call recipient) as the caller may be unwilling to share private information such as health test results without specific confirmation that the recipient has been authenticated.

A user of a communications service may use the end user authentication techniques disclosed herein to ensure that their incoming calls/messages/sessions will only be delivered or established after certain prerequisites and/or authentications have been performed. This can provide an enhanced level of security for the user, and reduce the risk that confidential or private information is unintentionally shared with others.

It will be appreciated that device and/or user authentication is routinely required before a user is allowed access to a network and/or a communications service via an electronic device. By way of example, before a user may access their Facebook account they are routinely required to provide authentication information such as, for example, a username and password. As another example, a cellular telephone or a tablet computer with Internet connectivity include password or other device authentication information that is stored in memory and supplied automatically to log onto the relevant network each time the electronic device is powered on and has Internet connectivity. However, once the user logs onto Facebook or their cellular telephone or tablet computer automatically log into the network, no additional authentication typically is required, and all messages, session requests and the like will be automatically sent, received and/or established without further authentication. However, pursuant to some embodiments, a user may specify that additional per-message or per-session end user authentication may be required. Moreover, this end user authentication may be selectively applied on a per-device basis, a per-caller basis or any other appropriate criteria. In this fashion, the user may provide increased security in order to reduce the risk that their private communications are made available to others.

As will be appreciated by one of skill in the art, the present invention may be embodied as a method or a data processing system. It will also be appreciated that computer program products may be provided that cause a data processing system and/or other communication network hardware to perform the steps of the methods according to some embodiments. Thus, aspects of the present invention may be implemented entirely in hardware, entirely in software, or as a combination of software and hardware. The software aspects of various embodiments may take the form of a computer program product on a computer-usable storage medium having computer-usable program code embodied in the medium. Any suitable computer readable medium may be utilized including, for example, hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While various embodiments have been described above with reference to the accompanying drawings, it will be appreciated that this invention may be embodied in many different forms and should not be construed as limited to the above-described embodiments. Rather, these embodiments are provided so that this disclosure will be thorough and complete, and will fully convey the scope of the invention to those skilled in the art. Like numbers refer to like elements throughout.

It will be understood that, although the terms first, second, etc. have been used above and in the appended claims to describe various elements, these elements should not be limited by these terms. These terms are only used to distinguish one element from another. For example, a first element could be termed a second element, and, similarly, a second element could be termed a first element, without departing from the scope of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

In the drawings and specification, there have been disclosed typical embodiments of the invention and, although specific terms are employed, they are used in a generic and descriptive sense only and not for purposes of limitation, the scope of the invention being set forth in the following claims.

The invention claimed is:

1. A method, comprising:
receiving, by a server, a packetized communication sent via a communications network, the packetized communication having a header identifying a recipient network address;
implementing, by the server, a hold on a delivery of the packetized communication via the communications network to the recipient network address;
retrieving, by the server, a pre-delivery authentication requirement associated with the recipient network address identified by the header;
determining, by the server, a satisfaction of the pre-delivery authentication requirement associated with the recipient network address identified by the header; and
releasing, by the server, the hold on the delivery of the packetized communication via the communications network in response to the satisfaction of the pre-delivery authentication requirement associated with the recipient network address identified by the header.

2. The method of claim 1, further comprising forwarding the packetized communication to the recipient network address in response to the releasing of the hold on delivery.

3. The method of claim 1, further comprising authenticating a recipient according to the pre-delivery authentication requirement.

4. The method of claim 1, further comprising sending a pre-delivery authentication request to the recipient network address.

5. The method of claim 1, further comprising receiving information in response to the pre-delivery authentication requirement.

6. The method of claim 1, further comprising storing the packetized communication until the releasing of the hold on the delivery.

7. The method of claim 1, further comprising failing to deliver the packetized communication in response to a failure of the pre-delivery authentication requirement.

8. A system, comprising:
   a hardware processor; and
   a memory device, the memory device storing instructions, the instructions when executed causing the hardware processor to perform operations, the operations comprising:
   receiving a packetized communication sent via a communications network, the packetized communication having a header identifying a recipient network address;
   implementing a hold on a delivery of the packetized communication via the communications network to the recipient network address;
   retrieving a pre-delivery authentication requirement associated with the recipient network address identified by the header;
   determining a satisfaction of the pre-delivery authentication requirement associated with the recipient network address identified by the header; and
   releasing the hold on the delivery of the packetized communication via the communications network in response to the satisfaction of the pre-delivery authentication requirement associated with the recipient network address identified by the header.

9. The system of claim 8, wherein the operations further comprise forwarding the packetized communication to the recipient network address in response to the releasing of the hold on delivery.

10. The system of claim 8, wherein the operations further comprise authenticating a recipient according to the pre-delivery authentication requirement.

11. The system of claim 8, wherein the operations further comprise sending a pre-delivery authentication request to the recipient network address.

12. The system of claim 8, wherein the operations further comprise receiving information in response to the pre-delivery authentication requirement.

13. The system of claim 8, wherein the operations further comprise storing the packetized communication until the releasing of the hold on the delivery.

14. The system of claim 8, wherein the operations further comprise failing to deliver the packetized communication in response to a failure of the pre-delivery authentication requirement.

15. A memory device storing code that when executed causes a hardware processor to perform operations, the operations comprising:
   receiving a packetized communication sent via a communications network, the packetized communication having a header identifying a recipient network address;
   implementing a hold on a delivery of the packetized communication via the communications network to the recipient network address;
   retrieving a pre-delivery authentication requirement associated with the recipient network address identified by the header;
   determining a satisfaction of the pre-delivery authentication requirement associated with the recipient network address identified by the header; and
   releasing the hold on the delivery of the packetized communication via the communications network in response to the satisfaction of the pre-delivery authentication requirement associated with the recipient network address identified by the header.

16. The memory device of claim 15, wherein the operations further comprise forwarding the packetized communication to the recipient network address in response to a release of the hold on delivery.

17. The memory device of claim 15, wherein the operations further comprise authenticating a recipient according to the pre-delivery authentication requirement.

18. The memory device of claim 15, wherein the operations further comprise sending a pre-delivery authentication request to the recipient network address.

19. The memory device of claim 15, wherein the operations further comprise receiving information in response to the pre-delivery authentication requirement.

20. The memory device of claim 15, wherein the operations further comprise storing the packetized communication until the releasing of the hold on the delivery.

* * * * *